United States Patent [19]
Parker

[11] Patent Number: 5,220,603
[45] Date of Patent: Jun. 15, 1993

[54] ACCESS CONTROL IN A DISTRIBUTED COMPUTER SYSTEM

[75] Inventor: Thomas A. Parker, Calne, England

[73] Assignee: International Computers Limited, London, England

[21] Appl. No.: 841,386

[22] Filed: Feb. 25, 1992

[30] Foreign Application Priority Data

Mar. 8, 1991 [GB] United Kingdom ............... 9104909

[51] Int. Cl.$^5$ ............................................. H04L 9/00
[52] U.S. Cl. ........................................ 380/21; 380/25
[58] Field of Search ............................. 380/21, 23, 25

[56] References Cited

U.S. PATENT DOCUMENTS

| | | | |
|---|---|---|---|
| 4,811,393 | 3/1989 | Hazard | 380/21 |
| 4,853,962 | 8/1989 | Brockman | 380/21 |
| 5,029,208 | 7/1991 | Tanaka | 380/21 |
| 5,093,860 | 3/1992 | Steinbrenner et al. | 380/21 |
| 5,136,642 | 8/1992 | Kawamura et al. | 380/21 |

*Primary Examiner*—David Cain
*Attorney, Agent, or Firm*—Lee, Mann, Smith, McWilliams, Sweeney & Ohlson

[57] ABSTRACT

A mechanism is described for controlling access to a target application (TA) in a distributed computer system. A user sponsor (US) acting on behalf of an end user is issued with a privilege attribute certificate (PAC) containing initiator qualifier attributes (IQA) identifying permitted users of the PAC. The US obtains a key from a key distribution server (KDS), the key having initiator qualifier attributes of the US cryptographically associated with it.

The US uses this key to communicate with the TA, and presents its PAC for verification. If the IQA in the PAC do not match the IQA associated with the key, this indicates that the PAC is being presented by the wrong initiator, and so access is not permitted.

If a receiving entity subsequently wishes to act as an initiator and to use the PAC by proxy, it acquires a key from the KDS, the key having the receiving entity's attributes cryptographically associated with it. This provides a way of regulating proxy use of PACs.

1 Claim, 2 Drawing Sheets

ACCESS CONTROL IN A DISTRIBUTED COMPUTER SYSTEM

BACKGROUND TO THE INVENTION

This invention relates to a method and apparatus for controlling access by users to target applications in a distributed computer system.

A framework for security in a distributed computer system has been proposed by the European Computer Manufacturer's Association (ECMA) and is described in the following references.

1) ECMA TR/46 "Security in Open Systems—a Security Framework" July 1988.
2) ECMA standard ECMA/138 December 1989.
3) "Network Access Control Development", COMPACS 90 Conference, London, March 1990.

The ECMA security framework permits a user to be authenticated to the system, and to obtain as a result a data package referred to as a privilege attribute certificate (PAC) which represents a certified collection of access rights. When the user wishes to access a target application, the user presents the PAC to that application as evidence of the user's access rights. The use of such PACs is described in our co-pending British Patent Application No 9015104.4.

It has been proposed to provide a special unit, referred to herein as a PAC validation facility (PVF) which can be used by the target applications to validate the PACs presented to the target applications.

It has also been proposed to provide a special unit referred to as a key distribution server (KDS) whose function is to provide encryption keys to users and applications on request, for use in communicating with other units in the system.

Typically, a PAC may be used several times by a user, to access several different target applications. It may also be permissible for a target application to use a PAC as a "proxy", to access a further target application on behalf of the user. However, such proxy use is undesirable if the first target application cannot be trusted not to misuse the PAC.

The object of the present invention is to provide a way of controlling proxy use of a PAC, while at the same time permitting the PAC to be used with many targets.

SUMMARY OF THE INVENTION

According to the invention, there is provided a data processing system in which a plurality of initiator entities can access a plurality of target entities, the system comprising:
a) means for issuing privilege attribute certificates (PACs) to the initiator entities,
b) verification means for verifying the PACs, and
c) key distribution means for issuing cryptographic keys to the initiator entities, characterised in that:
  (i) each initiator entity is assigned a set of initiator qualifier attributes,
  (ii) each said key issued to an initiator entity by the key distribution means has initiator qualifier attributes of the initiator entity cryptographically associated with it,
  (iii) each PAC contains initiator qualifier attributes corresponding to the initiator entity or entities entitled to use the PAC,
  (iv) when the verification means receives a PAC for verification, the verification means checks whether the initiator qualifier attributes in the PAC match those associated with the key used to communicate with the verification means.

DESCRIPTION OF AN EMBODIMENT OF THE INVENTION

One distributed processing system in accordance with the invention will now be described by way of example, with reference to the accompanying drawings.

Figure 1:
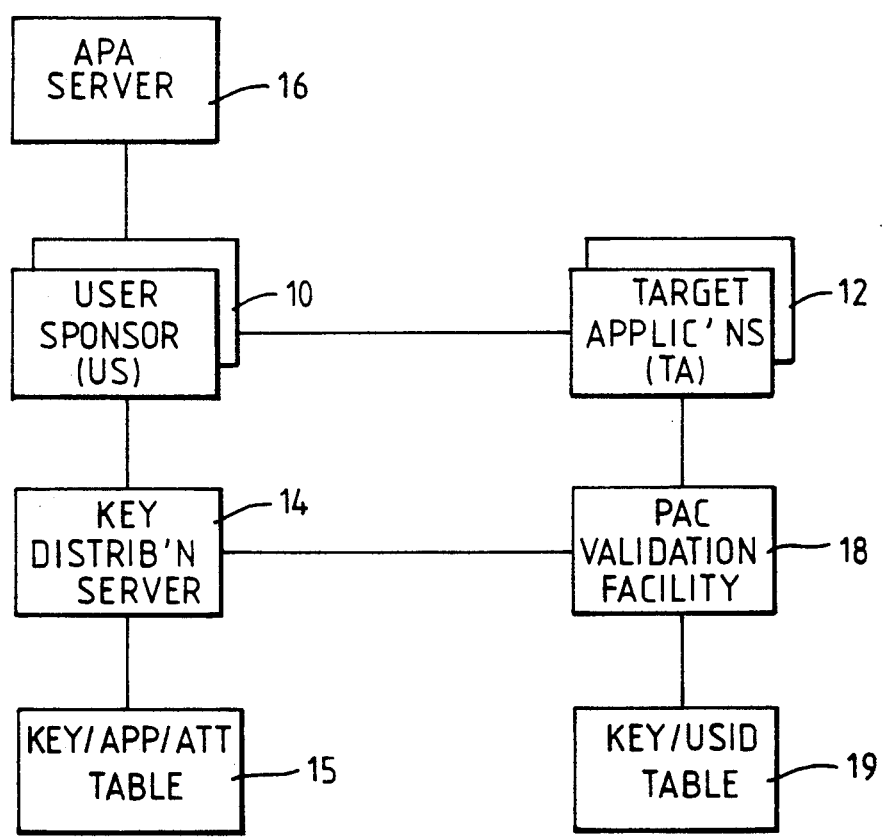
FIG. 1 is a block diagram of a processing system in accordance with the invention.

Referring to FIG. 1, the system includes a number of user sponsor units (US) 10, each of which acts on behalf of a particular end user. For example, a US may be a software module which runs on the user's workstation, to provide an interface between the user and the rest of the system.

The system also includes a number of target applications (TA) 12 which may be accessed by the users. The target applications may comprise database software or processing software.

A key distribution server (KDS) 14 is provided, for issuing cryptographic keys to the units in the system, to allow them to communicate with other units. The KDS is installed with a table 15 which holds an entry for each target application. Each entry contains a master key value which is shared between the KDS and the target application, and also contains a managed application identity APP and one or more application attributes ATT which are associated with the application.

No state information relating to the user sponsors need be held in the KDS.

An authentication and privilege attribute server (APA-server) 16, is provided for authenticating users, and issuing session keys to the user sponsors to allow them to communicate with the KDS, and for issuing privilege attribute certificates (PACs).

The system also includes a PAC validation facility (PVF) 18 whose function is to validate PACs presented to the target applications. The PVF maintains a table 19 in which, as will be described, it can form associations between keys and user identities.

In the following description, the following notation is used:

(XXX) K means that the value XXX is encrypted under the key K.

[XXX] K means that the value XXX is cryptographically signed or sealed under the key K.

Techniques for encryption and for cryptographic signing and sealing are well known in the art and so need not be described herein in any further detail.

Use of PAC by User Sponsor

Referring to FIG. 2, when a user sponsor (US) requires to access a target application TA, the following procedure takes place.

Figure 2A:
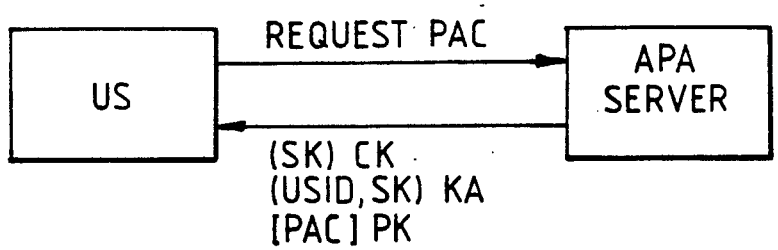
FIGS. 2a, 2b, 2c, 2d and 3a, 3b, 3c are sequence diagrams showing the operation of the system.

FIG. 2a: the US authenticates the user to the APA-server and requests it to provide a session key SK with which it can communicate with the KDS, and a PAC for the user. The APA-server returns the following information to the US:

(SK) CK (USID, SK) KA where CK is a communications key which is established between the US and the APA-server when a user initially logs on to the system, KA is a master key which is known only to the APA-server and the KDS, and USID is a unique identity which is assigned to the US by the APA-server. This identity USID may be an arbitrary unique value. It is not necessary for the US to have been registered with the APA-server in any way.

The APA-server also returns the requested PAC to the US, cryptographically signed under the APA-server's private key PK. The APA-server inserts the identity USID of the requesting US into a predetermined field of the PAC. If proxy use of the PAC is to be permitted, the APA-server also inserts into the PAC the application identity APP and/or attributes ATT of each application that may make such proxy use. These values (USID, APP and ATT) in the PAC are collectively referred to herein at initiator qualifier attributes (IQA) of the PAC.

Figure 2B:
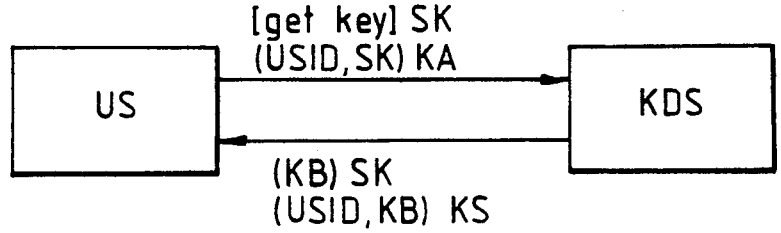

FIG. 2b: the US then uses the key SK to communicate with the KDS, requesting it to provide a basic key KB for communication between the US and the PVF. The request includes the value (USID, SK) KA, obtained from the APA-server as described above.

The KDS decodes this value, using the key KA, to obtain the key SK for communicating with the US. At the same time, it obtains the identity USID of the requesting US.

The KDS then returns the following information to the US:
ti (KB) SK (USID, KB) KS where KS is a secret key known only to the KDS and the PVF.

Figure 2C:
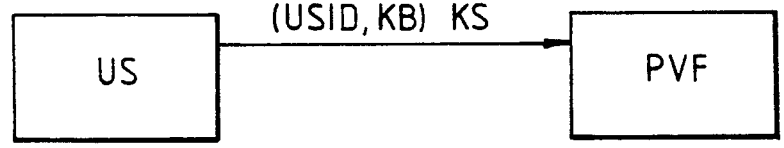

FIG. 2c: the US then sends the information (USID, KB) KS to the PVF, to inform it of the basic key KB that is to be used for communication between the US and the PVF. The PVF decodes this, using the key KS, to obtain KB. At the same time, the PVF obtains the identity USID of the US, and so is able to form an association between the identity USID and the key KB, by making an appropriate entry in the table 19.

Figure 2D:
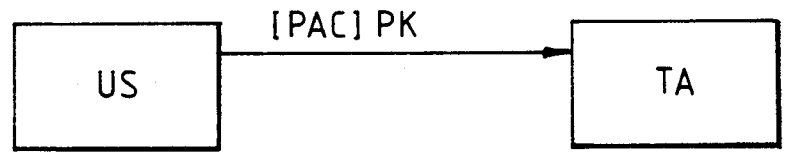

FIG. 2d: when the US requires to access a target application TA, it sends information including the signed PAC that it obtained from the APA-server. The TA presents this PAC to the PVF for validation.

The PVF checks the PAC to ensure that it is valid. The PVF also compares the USID in the IQA field of the PAC with the value of USID associated with the key KB. If they are not equal, the PAC is deemed to be invalid, because it is being offered by the wrong source.

Proxy use of PAC

Referring now to FIG. 3, the case will now be described where a first target application TA1 requires to make proxy use of a PAC it has obtained from a user sponsor, to access a second target application TA2 on behalf of the user.

Figure 3A:
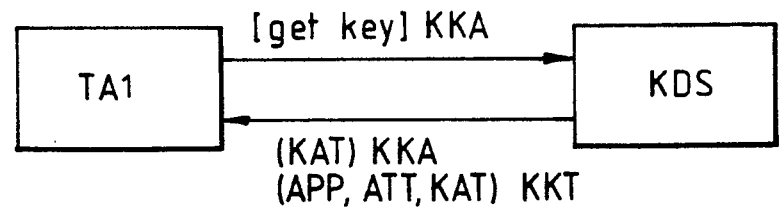

FIG. 3a: the application TA1 first sends a request to the KDS, requesting a dialogue key with which it can communicate with the target application TA2. This request is sealed under the master key KKA which is shared between the KDS and the application TA1.

In response this request the KDS consults its table 15 to find the entry containing the key KKA, and returns the information (KAT) KKA to the requesting application, where KAT is the required dialogue key for communication between TA1 and TA2.

The KDS also returns a package (APP, ATT, KAT) KKT where APP and ATT are the application identity and attributes obtained from the referenced table entry, and KKT is the master key shared between the KDS and TA2.

Figure 3B:

FIG. 3b: the application TA1 then sends the package (APP, ATT, KAT) KKT to the PVF. The PVF decodes this and is thus able to form an association between APP, ATT and the key KAT, making an appropriate table entry.

Figure 3C:
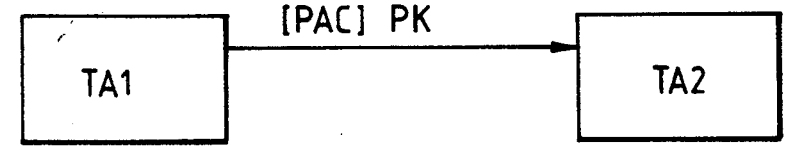

FIG. 3c: when TA1 requires to access TA2, it sends it the signed PAC. TA2 in turn presents this to the PVF for validation. The PVF then checks whether the APP and ATT in the IQA field of the PAC match those associated with the key KAT. If so, then proxy use of the PAC by TA1 is permitted, and so the PAC is validated. Otherwise, the PAC is deemed to be invalid.

Operation of the PVF

In summary, when the PVF is presented with a PAC for verification, it checks whether the following conditions are satisfied:
the USID in the PAC is equal to any USID associated in the table 19 with the key used.
one of the initiator qualifier attributes (IQA) in the PAC appears as an attribute associated with the key used.

If either of these conditions is satisfied, then the PAC may be validated; otherwise, the PVF declares the PAC to be invalid.

It should be noted that the US does not need to be authenticated in any way. What is being proved is that the same entity that asked for the PAC is offering it to the PVF.

In an alternative form of the invention, the authentication and PAC supplying aspects of the APA Service may be separately implemented, in which case the same form of protection may be possible for the Authentication Certificate used to authorise procurement of the PAC (see ECMA-138, where the authentication certificate is termed "Certified Identity").

I claim:
1. A data processing system comprising:
   (a) a plurality of initiator entries, each having a set of initiator qualifier attributes associated therewith,
   (b) a plurality of target entities, connected to and accessible by said initiator entries,
   (c) authentication means coupled to said target entities for issuing each target entity, on request, with a privilege attribute certificate (PAC) indicating access rights granted to that target entity,
   (d) PAC validation means, coupled to said target entities, for validating PACs on behalf of said target entities,
   (e) key distribution means, coupled to said initiator entities, for issuing to each initiator entity, on request, with
      (i) a first key, for communicating with the PAC validation means, the first key being encrypted under a second key known to both the initiator entity and the key distribution means,
      (ii) a package comprising said first key, and the initiator qualifier attributes of the initiator entity, encrypted together under a third key known only to the key distribution means and to the PAC validation means, (f) connection means for interconnecting each initiator entity to the PAC validation means to permit the initiator entity to present said package to the PAC validation means, and (g) a table associated with the PAC validation means, for recording an association between the first key and the initiator qualifier attributes in said package.

* * * * *